United States Patent
Mahapatra

(10) Patent No.: US 9,628,959 B1
(45) Date of Patent: Apr. 18, 2017

(54) USING VELOCITY DATA TO IMPROVE LOCATION ACCURACY OF WI-FI CROWDSOURCING

(71) Applicant: Amazon Technologies, Inc., Seattle, WA (US)

(72) Inventor: Abinash Mahapatra, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/713,973

(22) Filed: May 15, 2015

(51) Int. Cl.
*H04W 24/00* (2009.01)
*H04W 4/02* (2009.01)
*H04M 11/04* (2006.01)
*H04M 3/42* (2006.01)
*H04L 29/06* (2006.01)

(52) U.S. Cl.
CPC .................... *H04W 4/027* (2013.01)

(58) Field of Classification Search
CPC ....... H04W 4/02; H04W 64/00; H04W 24/00; H04M 3/42; H04L 29/06
USPC ...................................... 455/456.1
See application file for complete search history.

(56) References Cited

U.S. PATENT DOCUMENTS

| 7,925,995 B2 | 4/2011 | Krumm et al. | |
|---|---|---|---|
| 8,193,978 B2 | 6/2012 | Moshfeghi | |
| 2007/0002813 A1* | 1/2007 | Tenny | G01S 5/0242 370/338 |
| 2008/0225810 A1* | 9/2008 | Buchwald | H04W 4/02 370/338 |
| 2013/0109413 A1* | 5/2013 | Das | H04W 4/04 455/456.6 |
| 2014/0105197 A1 | 4/2014 | Chhabra | |

* cited by examiner

*Primary Examiner* — Huy C Ho
(74) *Attorney, Agent, or Firm* — Lee & Hayes, PLLC

(57) ABSTRACT

Techniques are described for using velocity data to improve the location accuracy of Wi-Fi crowdsourcing. Instead of relying on a reported location of an electronic device that detects a communication node, such as an Access Point (AP), the location of the communication node is adjusted based on the velocity of the electronic device when the electronic device detected the communication node. When a communication node is detected, the electronic device associates the device's location coordinates and associated velocity with the detected communication nodes to create data that is tagged with the identity of the communication nodes. The communication node data is sent to a location service for processing to estimate the location of the communication nodes. The location service may adjust the location of a communication node to be a specified distance from the location of the electronic device. In some cases, the higher the velocity, the greater the specified distance.

20 Claims, 6 Drawing Sheets

USING VELOCITY DATA TO IMPROVE LOCATION ACCURACY OF WI-FI CROWDSOURCING

BACKGROUND

Various electronic devices, such as smart phones, tablet computing devices, wearable computing devices (e.g., watches, glasses), portable media players, portable gaming devices, electronic readers, and the like, may include the capability to determine a location of the electronic device as well as the capability to detect and communicate via a wireless network (e.g., wide area network or a local area network). Data related to the location of the various devices as well as wireless networks near these devices may often be collected for various purposes. In some examples, crowdsourcing may be used to collect data. Crowdsourcing is a process used to collect data from a large group of these electronic devices. As the number of users of electronic devices has increased, data obtained from crowdsourcing is often robust as there are plenty of devices from which to collect. This data might be used by a device to determine a position of the device. In some cases, however, this data may not be as accurate as desired.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components of features.

DETAILED DESCRIPTION

Figure 1:
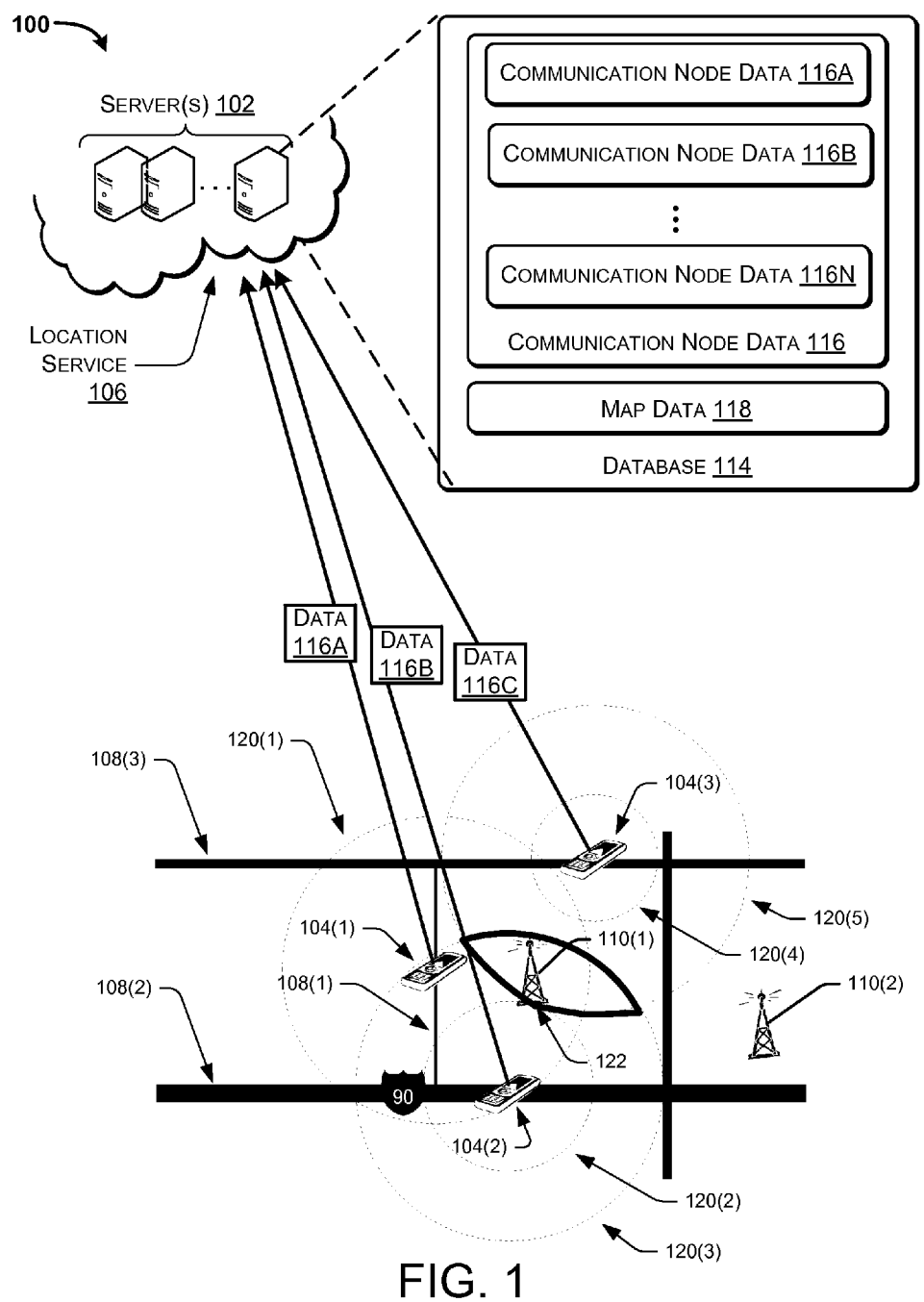
FIG. 1 illustrates a system for estimating locations of communication nodes using crowdsourcing data received from electronic devices that includes velocity data.

Described herein are techniques for using velocity data to improve the location accuracy of Wi-Fi crowdsourcing. When an electronic device, such as a mobile electronic device, detects a communication node, such as a wireless access point (AP), the location and the velocity of the electronic device is obtained. Generally, the velocity of the electronic device when an access point is detected provides an indication of whether the access point is likely to be within a particular distance from the electronic device. For instance, when the electronic device is traveling at highway speeds (e.g., 50-75 mph) the access point is likely to be outside of some predetermined distance from the electronic device (e.g., at least 30 meters). In contrast, when the electronic device is traveling at lower speeds, the access point is likely to be within a closer distance (e.g., 15 meters for a velocity of 30 mph, 5 meters for a velocity of 10 mph, or the like).

According to some configurations, the electronic device determines its location, using a Global Positioning System (GPS) to learn its geographic coordinates and determine a current velocity (e.g., speed of the electronic device). The device may seek its location as part of running an application, such as a mapping application. In some examples, the device scans for nearby communication nodes for various purposes, such as when the device needs to connect to a Wi-Fi access point or to create data for crowdsourcing purposes. For crowdsourcing purposes, the device may opportunistically scan for nearby communication nodes that may be used for communication (e.g., wireless communication). A "communication node" may refer to any communication device, such as a Wi-Fi access point, that may be used for wireless communication by the device (and other electronic devices). In some cases, the electronic device may scan for communication nodes, such as access points, when a GPS session is occurring on the electronic device (e.g., the GPS is turned on). When a communication node is detected, the electronic device associates the device's location coordinates and velocity with the detected communication nodes to create "communication node data." The communication node data may be stored locally on the electronic device.

In some configurations, the device may upload the communication node data to location service, or some other computing device, for analysis. In other examples, the device itself may estimate a location of a detected communication node. The device may send the communication node data to the location service periodically at timed intervals, or after a certain amount of data is collected, or upon any other event. The communication node data may be stored at the location service, or at some other location. As part of the crowdsourcing, the location service may aggregate the communication node data received from many devices throughout a common region to help learn and estimate the location of communication nodes (e.g., network access points) that are available within the region.

After receiving the communication node data, the location service may determine the locations of the access points using the communication node data that includes the velocity data associated with the electronic device. Generally, the location service excludes a certain area around the communication node from being recognized as a possible location of a communication node using the velocity of the electronic device when the communication node was detected. In this way, it is unlikely that an access point will be recognized as being located on a highway, freeway or some other roadway. For instance, when the electronic device is traveling at highway speeds (e.g., 50-75 mph) when an access point is detected, then the location service will exclude an area (e.g., 30 meters) around the electronic device from being considered as a possible location of the access point. Generally, the size of the area that is excluded is based on the velocity of the electronic device (e.g., the higher the velocity the larger the size of the area that is excluded).

In some configurations, the location service may utilize a map to assist in determining what areas to exclude and what areas may include the access point. For instance, if the location identifies that the user is on a road, then the location service may exclude a particular distance from the location based on the type of road. For example, the distance excluded may be thirty meters (or some other value) when the electronic device is on a freeway or highway, fifteen meters (or some other value) when the electronic device is on a residential road, five meters (or some other value) when the electronic device is located on a sidewalk, and the like. In some instances, the distances associated with the different types of roads or pathways may be based on zoning information (or other available information) that specifies how far a type of road can be from a building or some other structure. More details will be presented below with regard to FIGS. 1-6.

FIG. 1 illustrates a system 100 for estimating locations of communication nodes using crowdsourcing data received from electronic devices that includes velocity data. The system includes one or more servers 102 and any number of electronic devices, as represented by electronic devices 104(1)-104(3). The servers 102 can include a number of components, such as one or more processors, memory, one or more displays, and one or more interfaces, such as communication interfaces, and the like. The servers 102 can also include one or more input/output devices, such as a keyboard, microphone, and so forth. The servers 102 may also include capabilities for communicating with other servers, and devices such as the electronic device 104, via a wireless or wired network.

The servers 102 may be part of a location service 106, which collects and manages data from the electronic devices, such as devices 104. The location service 106 may be implemented as remote services, such as cloud services, which generally refer to a network-accessible platform implemented as a computing infrastructure of processors, storage, software, data access, and so forth that is maintained and accessible via a network, such as the Internet. The location service 106 may not require end-user knowledge of the physical location and configuration of the system that delivers the location services. Common expressions associated with such remote or cloud services include "on-demand computing," "software as a service (SaaS)," "platform computing," "network accessible platform," and so forth.

An example electronic device 104 may include a number of components, such as one or more processors, memory, one or more displays, and one or more interfaces, such as communication interfaces, peripheral device interfaces, and the like. In some implementations of the electronic device 104, such as in the implementations of a mobile phone, the device can include one or more antennas, analog-to-digital and digital-to-analog conversion chips, one or more signals processors, and radio frequency (RF) amplifiers. The electronic device 104 can also include one or more input/output devices, such as a keyboard, touchscreen, microphone, speakers, and so forth. In several implementations, the electronic device 104 may be a mobile device, such as a mobile phone, a tablet, a reader device, a laptop computer, a navigation system, a media playing device, a portable gaming device, a netbook computing device, a wearable computing device (e.g., watch, glasses), and so on.

The electronic device 104 may also include capabilities for detecting a location of the device and be capable of exchanging data over a wireless or wired network. The electronic device 104 may be configured to detect its own location by using any known navigation system. For instance, the detected location may be in terms of a latitude and longitude position on the surface of the earth. In an illustrative implementation, the electronic device 104 uses a Global Position System (GPS) resident on the device to determine location and velocity information for the device. Additionally, the electronic device 104 can have network interface controllers or a wireless network interface controller that allows the device to exchange data over a wired or wireless network. In the case of wireless networks, the electronic device 104 can utilize such wireless networks as a wide area network (e.g., cellular network) or a local area network (e.g., a Wi-Fi network), or the like.

The electronic device 104 can store and execute one or more user applications that utilize the device's navigation capabilities. For example, the one or more user applications can include a maps application, a social networking application, a gaming application, a marketplace application, or any other application that might utilize the location of the device for various services provided by the application.

In particular, an application may utilize the navigation capability of the electronic device 104 to ascertain a location of the device and tailor services provided to a user based on the location of device. In an illustrative example, an application that might be utilized may be a maps application that navigates pathways such as roads, streets, and sidewalks for a user. For instance, the maps application may identify one or more pathways 108, such as a sidewalk 108(1), an Interstate 108(2) and a city road 108(3). Generally, the pathway may be any pathway (paved or unpaved) that may be utilized by a user. In some examples, the pathway may include train tracks, subway tracks, and the like. In some examples, an application may also ascertain the velocity of a device 104. For instance, an application that utilizes the GPS of the device 104 may receive velocity data along with a location of the device.

At various times, the electronic device 104 may scan for the presence of communication nodes 110 that are within range of the device. Communication nodes 110(1)-110(2) may include any point within a network or a communication network including a connection point, a redistribution point or a communication endpoint. For example, within a local area network (LAN) or wide area router, a communication node 110 may be a cell tower, base station, mobile phone, or the like including any other access point which may have a corresponding media access control (MAC) address and/or a service set identifier (SSID) and/or any other type of identifier of the communication node.

In some configurations, the location of the device 104 may be determined in response to an application on the device 104 requesting the location of the device. For example, suppose a map application running on the device 104 wants to determine the location of the user in order to offer directions to a particular destination. While the electronic device 104 determines its location it may also obtain information about the presence of one or more communication nodes 110 that are within range of the device. One or more communication nodes 110 may be within a communicating range, communication range or detectable range of the device when the device may connect reliably to the communication node 110.

The range within which a communication node may be detected by the device is not a fixed figure and depends on a number of factors such as a height of antenna over surrounding terrain, the frequency of the signal in use, a transmitter's rated power, local geography, and directional characteristics of the node's antenna array, among other factors. For example, based on these factors, the range may vary from 150 to 300 feet to a few miles. In many examples, a communication node may be within a communicating range, communication range or detectable range of the device when the device is able to detect the communication node identifier of the communication node. In various implementations, a communication node 110 may periodically broadcast information corresponding to the communication node such as the communication node identifier of the communication node. The electronic device 104 may obtain this information by performing an opportunistic scan and detecting the presence of one or more of the communication nodes 110 while it also determines the location of the electronic device 104.

Alternatively, the electronic device 104 may have performed a scan and detected the presence of one or more communication nodes 110 prior to determining the location of the electronic device 104. If this scan was performed within a certain threshold amount of time to when the location and velocity of the electronic device 104 was determined, the electronic device 104 may use the data from the prior scan. For example, suppose that one second prior to opening the map application, the device 104 ran a web browsing application that needed access to a wireless network. The device 104 may have run a scan to determine the presence of one or more of the communication nodes 110 so that the browsing application may access the Internet. When the device 104 launches the map application and determines its location and velocity, instead of performing an additional scan to determine the presence of one or more of the communication nodes 110, the device 104 may use the data from the scan just performed.

The device stores information corresponding to the communication nodes along with the location of the device and a velocity of the device. This information may be used to create communication node data, which may include a device identifier, communication node identifier, longitude, latitude, velocity, time, accuracy metric, and the like. At predetermined intervals, the electronic device 104 may send the communication node data to the servers 102. In the current example, the electronic device 104(1) sends communication node data 116A to the location service 106, the electronic device 104(2) sends communication node data 116B to the location service 106, and electronic device 104(3) sends communication node data 116C to the location service 106.

As illustrated in FIG. 1, the electronic device 104(1) is traveling on a sidewalk 108(1) when it detects communication node 110(1). In response to detecting the communication node 110(1), the electronic device 104(1) may obtain and store the communication node data 116A. In some configurations, communication node data includes location data (longitude and latitude) of the electronic device 104(1) on the sidewalk 108(1) and a velocity (e.g., 3-4 mph) of the electronic device 104(1) when the communication node 110(1) was detected.

In the current example, the electronic device 104(2) is traveling along the Interstate 108(2) with a speed limit of at least fifty five miles per hour when it detects communication node 110(1). In response to detecting the communication node 110(1), the electronic device 104(2) may obtain and store the communication node data 116B. For example, the data may include the location of the electronic device 104(2) on the interstate 108(2) and a velocity (e.g., 55-75 mph) of the electronic device 104(2) when the communication node 110(1) was detected.

As illustrated, the electronic device 104(3) is traveling along the city road 108(3) with a speed limit below fifty five miles per hour (e.g., 20-45 mph) when it detects communication node 110(1). In response to detecting the communication node 110(1), the electronic device 104(3) may obtain and store the communication node data 116N. For example, the data may include the location of the electronic device 104(3) on the city road 108(3) and a velocity (e.g., 20-35 mph) of the electronic device 104(3) when the communication node 110(1) was detected. As discussed above, the electronic devices 104 may transmit the data 116 to the location service 106 periodically and/or in response to some other event or condition.

The servers 102 associated with the location service 106 may incorporate or have access to one or more databases, as represented by database 114. Database 114 is used to store the communication node data received from the electronic devices 104, as shown by the communication node data 116A, 116B . . . 116N. The servers 102 may receive communication node data from any number of electronic devices 104 and hence store communication node data 116A-116N from several different electronic devices.

In some configurations, the servers 102 may further maintain map data 118, as shown stored in the database 114. The map data 118 may include information identifying a location on the surface of the earth, as measured by latitude, longitude and radius. The map data 118 may contain data points corresponding to a city, a country, a specific region of the world or any geographical region defined by a latitude, a longitude and a radius. In some examples, the servers 102 use this data to determine a location of where a particular device 104 is located when a communication node 110 is detected. For instance, the servers 102 of the location service 106 may identify that the electronic device 104(2) is located on the Interstate 108(2) when the electronic device 104(2) detects the communication node 110(1). The location service 106 may also identify that the electronic device 104(3) is located on the city road 108(3) when the electronic device 104(3) detects the communication node 110(1). In some examples, all of the pathways that an electronic device 104 may be on when a communication node 110 is detected may not be identified. For example, the location service 106 may or may not be able to locate the electronic device 104(3) using the map data 118 when located on the sidewalk 108(1).

The location service 106 may use the location of the electronic device 104 to determine an area of where the detected communication node is likely located and an area (e.g., an exclusion area) in which a communication node is not likely located. In some examples, the type of pathway (e.g., Interstate, road, sidewalk) on which the electronic device 104 is located when the communication node 110 is detected indicates a potential area in which the communication node 110 is likely to be located and the area that is not likely. For instance, when the electronic device 104 is located on a pathway, such as a city road 108(1) or the Interstate 108(2) then the location service 106 may identify that the exclusion area includes a specified area directly around the location detected by the electronic device. In the current example, the size of the exclusion area that is determined to not include the communication node 110(1) is based on the type of road on which the electronic device 104 is traveling. For example, when the electronic device is on the Interstate 108(2) then the exclusion area may be represented by the dashed circle 120(2) having a radius (e.g., 15-30 meters) that is based on a distance that is likely to include the communication node 110(1).

In some cases, the distance from the detected location that is excluded may be based on zoning requirements or some other data that specifies how close buildings may be located from the pathway. For example, the zoning requirements may identify that a building may not be located within some specified distance from a pathway (e.g., 30 meters from an Interstate, and 15 meters from a city road). In other cases, the distance used for the exclusion area may be specified by some other authorized user (e.g., a service operator of the location service 106). In the current example, the location service 106 determines that the electronic device 104(1) is not associated with an exclusion area (since the pathway is a sidewalk), but that the electronic device 104(2) has an exclusion area of 120(2) (as represented by the dashed circle) and that the electronic device 104(3) has an exclusion area of 120(3) (as represented by the dashed circle) since the pathways are roads.

In other cases, the exclusion area may be based on velocity of the electronic device 104 when the communication node 110(1) was detected. Generally, the velocity of the electronic device 104 when the communication node 110(1) is detected provides an indication of how large the exclusion area should be. For instance, when the electronic device 104 is traveling at highway speeds (e.g., 50-75 mph) then it is likely that the communication node is located outside of some exclusion area (e.g., 30 meters). When the electronic device 104 is traveling at lower speeds when the communication node is detected then the size of the exclusion area may be decreased (e.g., 15 meters for a velocity of 30 mph, 5 meters for a velocity of 10 mph, or the like). In some cases, there is no exclusion area (e.g., when the electronic device is inside a building or when the velocity is less than 4 mph).

Including an exclusion area around an electronic device based on the velocity of the electronic device 104 and/or the map data 118 assists in not identifying the communication node 110(1) as being located on an Interstate, or located on some other roadway. For example, instead of identifying that the communication node 110(1) is located on the Interstate 108(3) (e.g., due to the large number of electronic devices 104 that may detect the communication node 110(1) while traveling on the Interstate), the communication node 110(1) is identified to be located at some location off of the Interstate. In the current example, the communication node 110(1) is identified as being located at location 122 that is represented by the intersection of the circles 120(1), 120(3), and 120(5) as indicated by the bold line around the communication node 110(1).

The circles 120(1), 120(2), and 120(3) represent an area in which the communication node 110(1) is likely located. In some examples, the size of the circles 120(1), 120(2), and 120(3) may be based on an estimated transmission range of the communication node 110(1). For instance, the size of the circle may be based on an average transmission range (e.g., 75 meters) of a communication node, such as an access point. While a circle is illustrated as the exclusion area, other areas may be used as the exclusion area that are regularly shaped (e.g., squares, rectangles) or that are irregularly shaped. For instance, the exclusion area may be based on a direction the mobile device is pointed when the communication node 110(1) is detected combined with characteristics of the device (e.g., type of antenna(s)), and the like.

Figure 2:
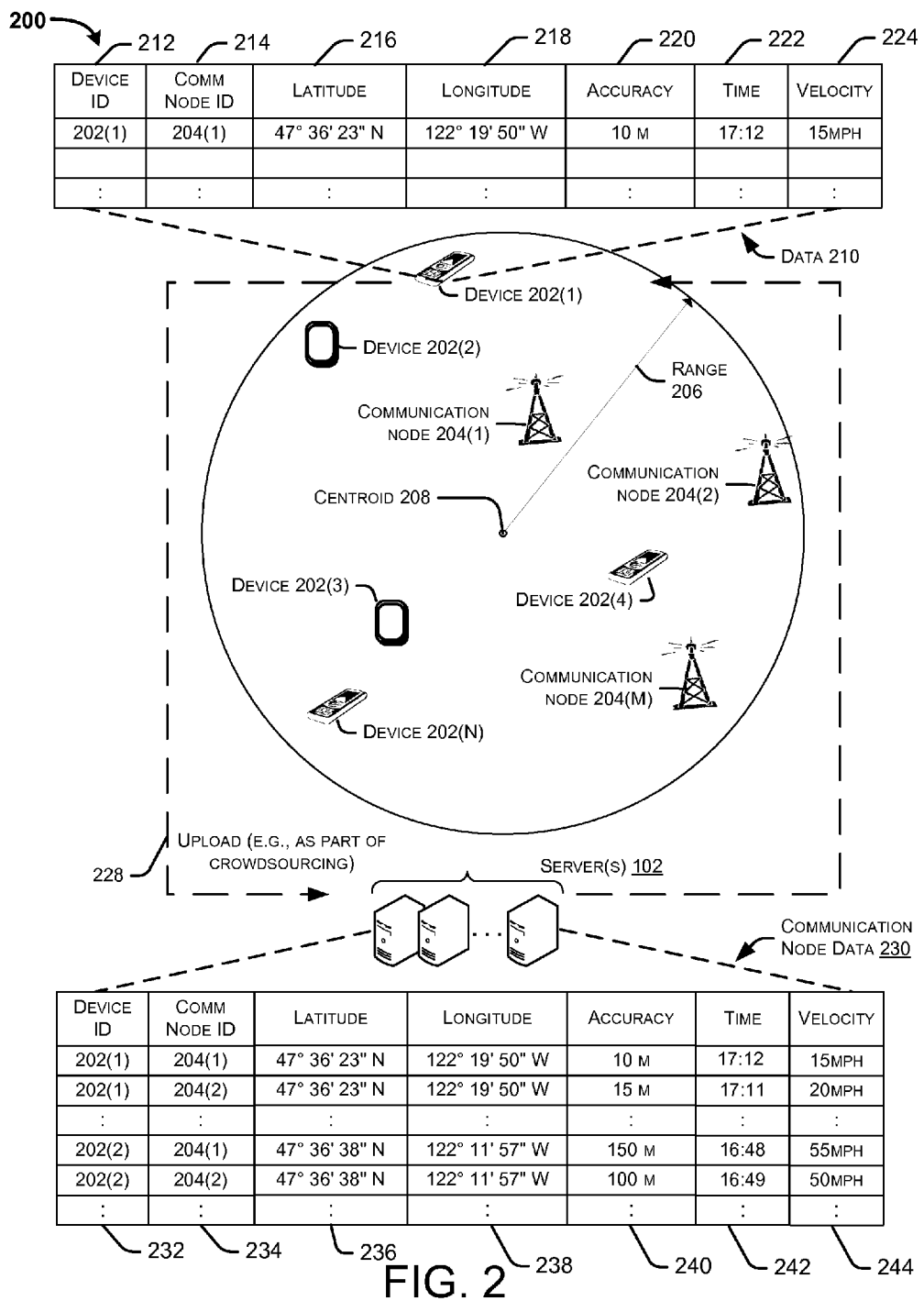
FIG. 2 illustrates an environment in which electronic devices may upload information related to a communication node.

FIG. 2 illustrates an environment 200 in which electronic devices may upload information related to a communication node. As illustrated in environment 200, various devices 202(1), 202(2), 202(3), 202(4), . . . , 202(N) may temporarily store information related to their location and velocity and to detected communication nodes 204(1), 204(2), . . . , 202(M), and subsequently upload that data to the servers 102 as part of a crowdsourcing session.

FIG. 2 depicts various devices 202(1)-(N) and communication nodes 204(1)-(M) within a certain area, as represented by a given range 206 around a centroid 208. In this example, the centroid 208 may represent any position on the surface of the earth, as measured by the intersection of a latitude and longitude on the earth. As illustrated in FIG. 2, devices 202(1)-(N) can be essentially any electronic device, as described above with respect to device 104 (e.g., a mobile phone, a tablet, a reader device, a laptop computer, etc.). Additionally, communication nodes 204(1)-(M) can include any access point within a network as described above with respect to nodes 110(1)-(N) (e.g., a router, a cell tower, base station, mobile phone, or the like).

At any given time, one of the devices, such as device 202(1), may determine its own location and velocity. For instance, a user might launch an application that queries the electronic device 202(1) for its location and velocity. In response to the query, the device 202(1) may utilize a location engine within the device 202(1) to determine its location and velocity. In several examples, the location engine may utilize a navigation system that provides location information anywhere on or near the surface of the earth. As one example, the device 202(1) utilizes a GPS component that returns a specific location address (e.g., longitude and latitude) that may be used by the location engine to determine a velocity of the device.

As part of determining a location and velocity of the device, prior to, or separately therefrom, the device 202(1) may also initiate a scan to detect the presence of any nearby communication nodes 204(1)-(M). In this illustrative implementation, the device 202(1) may detect the presence of the communication nodes 204(1)-(M) within the range 206. The device 202(1) stores data 210 in its memory, where the data corresponds to the device's location within the range 206 around centroid 208 as well as the detected presence and identities of local communication nodes 204(1)-(M). While shown in conjunction with device 202(1) for discussion purposes, data 210 is representative of various pieces of data that each device 202(1)-(N) may store within respective local device memory with respect to detected communication nodes 204(1)-(M). The data 210 may be stored in a structured form, with each instance or record having any number of data fields such as a device identifier 212, a communication node identifier 214, a latitude value 216, a longitude value 218, an accuracy value 220, a time stamp 222, and a velocity 224. These are merely representative fields, and more or less data fields may be included in the data 210.

The device identifier field 212 is an identifier that is unique to the associated device 202(1)-(N). In data 210, device 202(1) has its identifier listed in the field, as represented by the reference number 202(1). The communication node identifier field 214 contains identifiers that are unique to the communication nodes 204(1)-(M) that are found by the device 202(1)-(N). For instance, continuing the illustrative implementation with regards to device 202(1), suppose the device 202(1) scans for nearby communication nodes within the range 206 and identifies communication node 204(1). The device 202(1) stores as part of the data 210 a communication node identifier 214 for the detected communication node 204(1), as represented by the reference number 204(1) for the node. In many implementations, the communication node identifier can include any unique device identifier of the communication node. For example, the communication node identifier 214 may be a unique device identifier that may be assigned to the communication node by a manufacturer of the communication node. In other implementations, the communication node identifier 214 is a permanent identifier of the communication node 204(1) within a physical network segment, where the communication node identifier 204(1) does not change, for example, when the communication node 204(1) is connected to a different network.

In various implementations, the device 202(1) can scan for nearby communication nodes 204(1)-(M) by detecting signals broadcast from the nearby communication nodes. As mentioned previously, periodically, the communication nodes 204(1)-(M) broadcast relevant information such as its communication node identifier. The device 202(1) can detect this periodically broadcast information as well as the strength of the signal when it performs a scan for nearby communication nodes and store the information in the device memory.

Additionally, each device, such as device 202(1), may store the device's current velocity in the form of velocity 224 and location in the form of a latitude 216 and longitude 218. Velocity 224 corresponds to a current velocity (e.g., 0, 4, 15, 30, 60 mph) of the device. Latitude 216 and longitude 218 correspond to positions within a geographic coordinate system of the earth. In other examples, the device's current location can be recorded using any coordinate system that uniquely identifies locations on the surface of a sphere, such as a spherical coordinate system. Device 202(1) can also store information related to its elevation relative to the sea level (not shown).

Device 202(1) may also store an accuracy value 220 as part of the data 210. In several implementations, accuracy value 220 corresponds to a confidence level of the detected location of the device 202(1). In one example, the accuracy of the detected location of the device 202(1) may indicate that the position of the device 202(1) is accurate within a circle of confidence. In an illustrative implementation, the accuracy may indicate that the device 202(1) is within a few meters of the detected location of the device (e.g., on the highway) or within several hundred meters of the detected location (e.g., in a densely populated downtown area).

Additionally, in the illustrative implementation, a time at which each recorded instance of the communication node identifier 214, latitude 216, longitude 218, and accuracy 220 were captured on the device 202(1) is stored in field 222 as part of the data. In other implementations, the time 222 may correspond to when all of the data was acquired or when one or a few of these data were acquired.

Similar to the data 210 stored on device 202(1) in FIG. 2, each of the other devices 202(2)-(N) may likewise detect the local communication nodes 204(1)-(M) within the range 206 and store associated data within each device's local memory. For example, device 202(2) may detect the presence of one or more communication nodes 204(1)-(M) and store within its local memory the associated communication node identifiers, latitude and longitude of the device 202(2) during detection, an accuracy, a time corresponding to when this data was acquired, and a velocity of the device. Similarly, device 202(3) may detect the presence of one or more communication nodes 204(1)-(M) and store within its local memory the associated communication node identifiers, and so on. Accordingly, each device identifier is associated with the communication node identifier in the data 210.

In the illustrated implementation of FIG. 2, the data 210 of the various electronic devices 202(1)-(N) can be uploaded at various times based on various techniques described herein to one or more servers, such as the servers 102. For instance, the data may be uploaded as part of a crowdsourcing session or exercise. This is illustrated graphically in FIG. 2 as dashed flow line 228 from device 202(1) to servers 102. Since this data includes information about detected nodes, such as Wi-Fi access points, the uploaded data is termed "communication node data" herein to help explain that the location data and velocity data is tied to the data about the communication nodes. The data 210 from device 202(1) may be uploaded at a different time from the data of other devices, such as device 202(2). Each device 202(1)-(N) may upload its data based on a predetermined time interval that may be unique to each device. Additionally, each device 202(1)-(N) may upload its respective data to the same server, a different server, or multiple servers.

As shown in FIG. 2, the periodically uploaded data from each device 202(1)-(N) is stored as communication node data 230 at the servers 102. The communication node data 230 aggregated from the multiple devices 202(1)-(N) may be stored in a structured form, with each instance or record having any number of data fields, such as a device identifier 232, a communication node identifier 234, a latitude value 236, a longitude value 238, an accuracy value 240, a time stamp 242, and a velocity 244. These are merely representative fields, and more or less data fields may be included in the communication node data 230.

As depicted in FIG. 2, the communication node data 230 aggregates the data recorded at the various devices 202(1)-(N). Here, for example, communication node data received from the device 202(1) includes multiple node identifiers 204(1), 204(2), etc. In each case, the location of the device 202(1) is recorded as part of the latitude and longitude fields 236 and 238. Similarly, the device 202(2) also detects the communication nodes 204(1), 204(2), etc. But, the device 202(2) is in a different location than device 202(1), as represented by the latitude 236 and longitude 238 for device 202(2) (i.e., 47° 36' 38" N by 122° 11' 57" W) being different than that for device 202(1) (i.e., 47° 36' 23" N by 122° 19' 50" W). However, in some implementations, these data points may be similar since the devices 202(1) and 202(2) are located within a range 206 of centroid 208. In cases where the location engine may provide a location of a device with a granularity that is less than range 206, the latitudes and longitudes. Additionally, the times provided in time field 242 are likely to be different for each record in the communication node data 230, as the devices 202(1)-(N) may acquire the data at different times.

Although FIG. 2 shows a set of servers 102, the data 210 from the devices 202(1)-(N) may be uploaded to other sets of one or more servers where each server set may be serviced by different and unrelated entities. In this implementation, each entity may manage their own database of communication node data. Data 210 is not necessarily uploaded to one or more servers at the same time, nor is this information necessarily uploaded to the same server.

In an illustrative implementation, device 202(1) may have a predetermined time at which it will contact servers 102 to indicate that it is ready to upload its data 210. In some examples, device 202(1) can upload data it has acquired in the last 12 hours, 24 hours, or the like. Similarly, the other devices 202(1)-(N) can have respective periods of time within which each device is programmed to upload data it has recently acquired to the servers 102.

Figure 3:
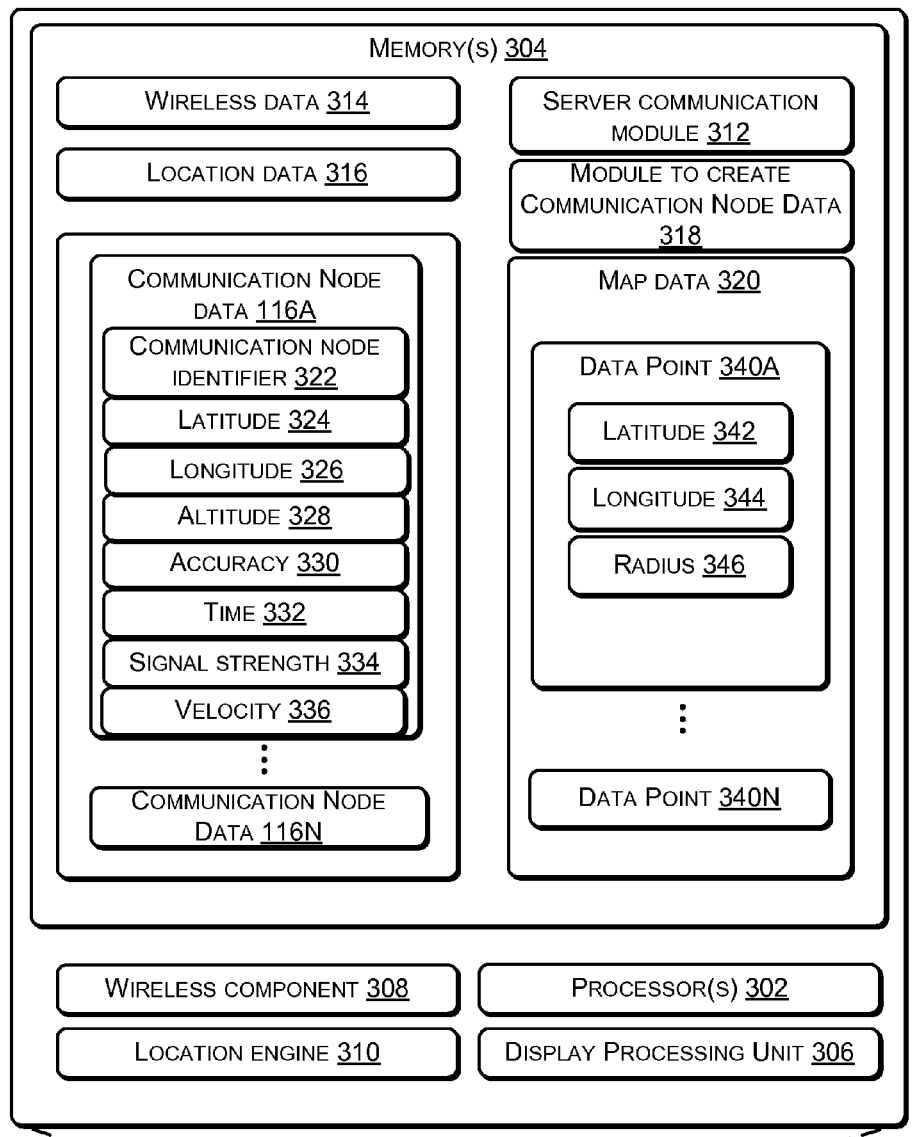
FIG. 3 illustrates an example electronic device that may obtain and provide communication node data to the location service.
Figure 3:
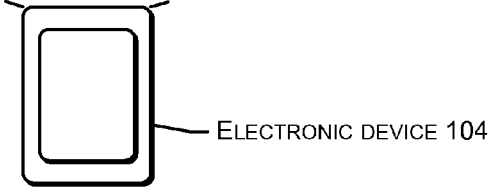

FIG. 3 illustrates an example electronic device that may obtain and provide communication node data to the location service. The example electronic device may be the electronic device 104 (or any of devices 202(1)-(N)) configured to gather data related to the presence of various communication nodes as well as the location of the electronic device. In several implementations, the electronic device 104 can include one or more processors 302, one or more memory devices 304, a display processing unit 306, wireless component 308, and a location engine 310.

The one or more processors 302 may include at least one hardware processor, such as a microprocessor. In some cases, the one or more processors 302 may include a central processing unit (CPU), a graphics processing unit (GPU), or both a CPU and GPU, or other processing units. Additionally, the one or more processors 302 may include a local memory that may store program modules, program data, and/or portions of one or more operating systems. In an illustrative implementation, the one or more processors 302 may also include a cache memory and one or more registers as well as digital electronic circuits such as an arithmetic logic unit (ALU) and a control unit.

In some instances, wireless component 308 may coordinate the exchange of data packets in the form of signals via a wireless local area network. In other implementations, this exchange of data packets may occur via a wireless wide area network. Wireless component 308 may utilize one or more antennas to exchange the data packets or communicate signals over the wireless network. For example, wireless component 308 may utilize the one or more antennas to communicate signals via a wireless local area network. In other examples, the wireless component 308 may exchange data packets via Bluetooth and/or Near Field Communication (NFC) technologies. In another example, the wireless component 308 may utilize the one or more antennas to communicate signals via a wireless wide area network. In several implementations, wireless component 308 may scan for the presence of communication nodes within range of the electronic device 104. In several implementations, data corresponding to detected communication nodes may be stored as wireless data 314. In an illustrative example, wireless data 314 may include a communication node identifier, and a signal strength of the detected communication node.

In several implementations, location engine 310 may have the capability to detect the location of the electronic device 104 on the surface of the earth. The location engine 310 may communicate with one or more satellites orbiting the earth via an antenna that is tuned to the frequencies transmitted by the one or more satellites. In various implementations, location engine 310 may determine a location of the electronic device 310 in terms of coordinates, a velocity, and also determine an accuracy of the determined coordinates. For instance, in the case where the electronic device 104 is moving along on a freeway, the accuracy may indicate that the determined coordinates are accurate to a few meters and the velocity is around 55 mph. In another example, when the electronic device 104 is moving through a downtown area, the accuracy may indicate that the determined coordinates are accurate to a few hundred meters.

The location engine 310 may also determine a velocity or speed of the electronic device 104. For example, when the electronic device 104 is traveling on a highway the speed may be near 60 mph, whereas when the electronic device 104 is traveling on a local road, the speed may be near 30 mph. Similarly, when the user is walking with the electronic device 104, the speed may be near 4 mph. As discussed herein, the velocity of the electronic device 104 may provide an indication of how likely it is that a communication node is located within a specified area. In some configurations, the faster the speed of the electronic device 104, the higher the probability that the communication node is located farther from the detected location of the electronic device 104. As discussed above, in some examples, the size of the exclusion area becomes larger as the velocity of the electronic device increases. In other examples, the size of the exclusion area is based on the average speed of the electronic devices that are near other locations where the communication node is detected (e.g., the speed of the electronic devices on a same pathway is averaged).

Additionally, the location engine 310 may also determine an altitude of the electronic device 104 in relation to the sea level. In some instances, the coordinates may be part of a geographic coordinate system, and more particularly a common choice of coordinates may include latitude, longitude, and elevation. In particular, location engine 310 can be a Global Positioning System (GPS) engine. Accordingly, location engine 310 may provide location data 316 in the form of a latitude and longitude position of the electronic device 104 along with an accuracy and altitude.

In addition, the electronic device 104 may include one or more memory(s) 304 that may constitute one or more computer-readable storage media. The one or more memory(s) 304 may include volatile and nonvolatile memory and/or removable and non-removable media implemented in any type of technology for storage of information, such as computer-readable instructions, data structures, program modules or other data. Such memory(s) 304 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the electronic device 104, the memory(s) 304 may be a type of tangible computer-readable storage media and may be a non-transitory storage media.

The memory(s) 304 may be used to store any number of functional components that are executable by the one or more processor(s) 302. In many implementations, these functional components comprise instructions or program that are executable by the one or more processor(s) 302 and that, when executed, implement operational logic for performing the operations attributed herein to the electronic device 104. Functional components of the electronic device 104 that may be executed on the one or more processor(s) 302 for implementing the various functions and features related to configuring the electronic device 104 to transmit communication node data in accordance with the methods disclosed herein include: a server communication module 312 and a module to create communication node data 318.

In some cases, the module to create communication node data 318 may correlate wireless data 314 with location data 316 to create communication node data 116A-116N. As discussed previously, the wireless data 314 may comprise data corresponding to detected communication nodes. Additionally, as discussed previously, location data 316 may include data corresponding to a detected location of the electronic device 104. In an implementation, the module to create communication node data 318 may correlate wireless data 314 with location data 316 based on when each was acquired, to create communication node data 116A-116N. In various implementations, the module to create communication node data 318 may detect that the location engine 310 has been activated and the module to create communication node data 318 may subsequently direct the wireless component 308 to perform a scan for nearby communication nodes.

In other implementations, the module to create communication node data 318 may determine that a scan has been performed within a threshold amount of time of the activation of the location engine 310. In such instances, the module to create communication node data 318 may obtain data for nearby communication nodes from wireless data 314 without initiating a separate scan for nearby communication nodes. The threshold amount of time might be a predetermined amount of time such as a few seconds or a few minutes, and the like. The threshold amount of time may also be calculated based on a projected or observed distance traveled by the device. Accordingly, if the distance traveled by the device is observed or anticipated to be large over a span of minutes (e.g., the device is in a moving car), the threshold amount of time may be determined to be a few seconds. This is due to the fact that data acquired by the wireless component 308 that is older than the determined few seconds may not accurately reflect nearby communication nodes during the time the location engine 310 is activated. In the event that wireless data 314 was not acquired within the threshold amount of time, the module to create communication node data 318 may direct the wireless component 308 to perform a scan for nearby communication nodes. The data obtained via both the location engine 310 and wireless component 308 may be stored as location data 316 and wireless data 314 respectively.

In an illustrative implementation, communication node data 116A-N comprises a communication node identifier 322, a latitude 324, a longitude 326, an altitude 328, an accuracy 330, a time 332, a signal strength 334, and a velocity 336. In certain implementations, communication node identifier 322 includes the unique device identifier of a communication node, such as communication node 110(1). In this example, the communication node identifier 322 may be a media access control address (MAC address) that may be assigned to the communication node 110(1) by a manufacturer of the communication node 110(1) and stored in the hardware of the communication node 110(1). In other implementations, the communication node identifier 322 may be any other identifier that uniquely identifies the communication node and does not change with a change in network configurations. In one implementation, the communication node identifier 322 may be used as a network address for communications on a physical network segment. In this example, when a device such as the electronic device 104 scans for nearby communication nodes, the electronic device 104 may acquire the communication node identifier 322 corresponding to the communication node 110(1) upon detecting the presence of the communication node.

Latitude 324 and longitude 326 may correlate to latitude 216 and longitude 218 as described previously with regards to FIG. 2. Similarly, accuracy 330 and time 332 may also correspond to altitude, accuracy 220 and time 222 as described in FIG. 2. The altitude 328 represents the height of the device, such as measured relative to sea level. In various implementations, signal strength 334 may reflect the signal strength of the communication node. The velocity 336 indicates a velocity (i.e., speed) of the electronic device 104 (e.g., when a communication node 110 is detected).

In several implementations, electronic device 104 may include a server communication module 312. In various implementations, the electronic device 104 may send information to the servers 102 indicating that the electronic device 104 is ready to upload communication node data 116A-116N to the servers. As discussed previously, this information may be sent to a single server or multiple servers. In some configurations, the server communication module 312 may communicate via the wireless component 308 to the servers 102. Accordingly, the server communication module 312 may communicate with the servers 102 via a wireless local area network (e.g., Wi-Fi) or a wireless wide area network (e.g., LTE, WiMAX, or other cellular network technologies). The server communication module 312 may query the servers 102 to determine whether communication node data is required for a particular location of the electronic device 104. In an illustrative example, the server communication module 312 may transmit a location of the electronic device 104 in the query to the servers 102. In other implementations, the server communication module 312 may transmit a communication node identifier in the query to the server 102. Additionally, in some cases, the server communication module 312 may coordinate the transfer of map data, such as map data 320 from the server 102 to the electronic device 104.

In various implementations, the map data 320 may include multiple data points 340A-340N. Each data point, such as data point 340A, may contain information identifying a location on the surface of the earth. Data point 340A may include a latitude 342, longitude 344 and radius 346. The data points 340A-340N may correspond to several locations on the surface of the earth and essentially constitute a map identifying several different areas on the earth. For example, data point 340A may correspond to an area on the earth defined by all points around the intersection of latitude 342 and longitude 344, within a distance of radius 346. Accordingly, map data 320 may contain data points corresponding to areas within a neighborhood, city blocks, a city, a country, or a specific region of the world. Additionally, data point 340a includes a time stamp 348 that may indicate when that data point is set to expire.

In an illustrative implementation, the electronic device 104 may activate the location engine 310 to determine a location and velocity of the electronic device 104. In some cases, the location engine 310 may be activated by an application that requires a location of the electronic device 104. In various implementations, the module to create communication node data 318 may detect the initiation of the location engine 310 and it may utilize wireless component 308 to obtain wireless data 314. Accordingly, the wireless component 308 may scan for the presence of communication nodes and store data corresponding to detected communication nodes as wireless data 314. In some implementations, the module to create communication node data 318 may correlate the wireless data 314 with location data 316 to create communication node data 116A-116N.

The server communication module 312 may also utilize the wireless component 308 to communicate with other devices within range of the electronic device 104. For example, when the server communication module 312 receives a notification to suppress the communication node data that correlates to a specific communication node identifier or a particular latitude and longitude, the server communication module 312 may utilize the wireless component 308 to broadcast to the other devices that it received a notification to suppress. The wireless component 308 may broadcast the notification using Bluetooth or NFC technologies. In some instances, the notification may include information about the location of the electronic device 104. In other cases, the wireless component 308 may detect the presence of another electronic device and subsequently send the notification to the other electronic device.

In some implementations, the server communication module 312 may coordinate the transfer of map data 320 from the server to the electronic device 104. Additionally, the server communication module 312 may coordinate the transfer of map data 320 to other devices within the vicinity of the electronic device 104. In some cases, the electronic device may detect the presence of other electronic devices and initiate a transfer of map data 320 to the other electronic devices. The map data 320 may be distributed to other devices using any wireless, wired, Bluetooth or NFC technologies.

In some instances, the server communication module 312 may detect that the electronic device 104 has changed locations and send a query to the servers 102 to determine whether the servers 102 needs communication node data corresponding to the new location. In an illustrative implementation, the electronic device 104 may detect that it has moved from California to Manhattan and query the servers 102 to determine whether it should generate and send communication node data.

Figure 4:
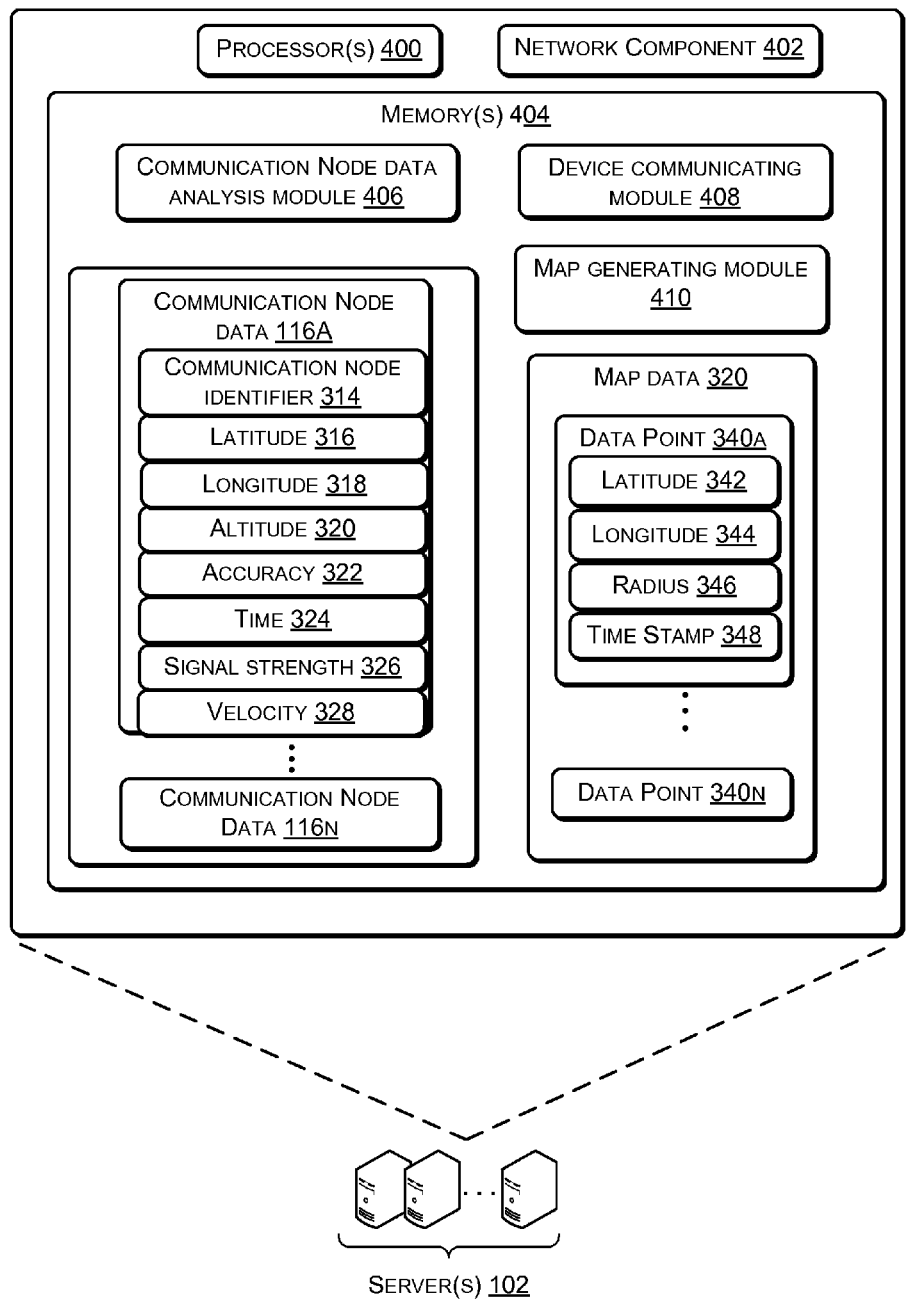
FIG. 4 illustrates an example server that may store the communication node data received from electronic devices.

FIG. 4 illustrates an example server that may store the communication node data received from electronic devices. As illustrated, the servers 102 are configured to gather data related to the locations of various communication nodes when a communication node is detected. Although one set of servers 102 is illustrated in the system 100 described with regards to FIG. 1, multiple sets of servers may be used by different entities to collect data related to the locations of various communication nodes. Further, each set of servers may have one or multiple servers. For discussion purposes, the components described in FIG. 4 will be discussed as residing in a single server 102. The server 102 may include a number of components related to gathering data corresponding to the locations of various communication nodes. For example, the server 102 may include one or more processors, such as the representative processor 400. The processor 400 may include a hardware processing unit, such as a central processing unit, a graphics processing unit, or both. Additionally, the processor 400 may include a local memory that may store program modules, and/or program data. In an illustrative implementation, the processor 400 may include a cache memory and one or more registers as well as digital electronic circuits such as an arithmetic logic unit (ALU) and a control unit. The server 102 may also include input/output devices that may include one or more display devices, such as a liquid crystal display, a touch screen display, a display utilizing another type of display technology, or a combination thereof. The input/output devices may also include a keypad, a keyboard, a pointer device, one or more speakers, combinations thereof, and the like.

The server 102 also includes a network component 402 which implements network connectivity for the server 102. The network component 402 enables the server 102 to communicate with other devices where the communication is typically achieved by exchanging discrete data packets or frames over network signal lines such as twisted pair, coaxial, optical fiber, telephone lines, satellites, microwave, relays, modulated AC power lines, infrared wireless, or other conventionally known data transmission systems. In several implementations, the network component 402 may also enable the server 102 to communicate over a wireless network such as a wireless local area network or a wireless wide area network.

Several implementations of the server 102 may include one or more memory devices, such as memory 404. Memory 404 may include, but is not limited to, RAM, ROM, EEPROM, flash memory, one or more hard disks, solid state drives, optical memory (e.g., CD, DVD), or other non-transient memory technologies. In an implementation, at least a portion of the data stored by the memory 404 may be located remotely from the server 102 and be accessible by a number of computer devices of the server 102. In some cases, the memory 404 may be accessible by third parties.

The memory 404 is utilized to store data corresponding to the locations of communication nodes, received from devices such as the electronic device 104. Additionally, the memory 404 may maintain information that is utilized to provide a location of a communication node to a device, such as the electronic device 104. The memory 404 may store one or more of the following modules: communication node data analysis module 406, device communicating module 408, map generating module 410, as well as communication node data 116A-116N, and map data 320.

In various implementations, communication node data 116A-116N may include data received from the electronic device 104. As discussed with regards to FIG. 3, in several examples, this data is acquired by the electronic device 104 when the device's location is determined as well as during a scan performed to detect nearby communication nodes. As also discussed with regards to FIG. 3, communication node data 116A may include among other data, a communication node identifier 322, a latitude 324, a longitude 326, an altitude 328, an accuracy 330, a time 332, a signal strength 334, and a velocity 336.

In several implementations, the communication node data analysis module 406 may receive the communication node data from various devices such the electronic device 104. In several cases, the communication node data analysis module 406 may receive the data on a periodic basis from each electronic device, i.e., every 12 hours, every 24 hours, etc. In other cases, the communication node data analysis module 406 may receive a certain amount of data from various electronic devices.

Additionally, the communication node data analysis module 406 may analyze the stored communication node data such as communication node data 116A-116N to determine a location of an electronic device and locations of detected communication nodes. In an illustrative implementation, an electronic device might be present in an area where GPS signals are difficult to detect, such as when an electronic device is indoors or underground or due to weather conditions. In this example, the electronic device might detect communication nodes near its current location and send these detected communication nodes to a location database server such as server 102 in a query prompting the server for a location. In turn, the server 102 may determine via the communication node data analysis module 406 whether it has any communication node data, such as communication node data 116A-116N that corresponds to the communication nodes currently being detected by the electronic device. In its initial query, the electronic device may send the communication node identifiers of the detected communication nodes. During its determination, the communication node data analysis module 406 may identify which communication node data is relevant to the query by searching for the communication node identifiers that match the identifiers that were received from the electronic device. If the server communication node data analysis module 406 identifies a sufficient amount of communication node data to determine where these detected communication nodes might be located, then the communication node data analysis module 406 will respond with a location. Otherwise, the communication node data analysis module 406 may respond with an error message or any other known message to indicate that the query was unsuccessful due to the communication node data analysis module 406 lacking sufficient data to determine a location of the device. In several cases, the ability of the server 102 to determine the approximate location of an electronic device is particularly helpful when an electronic device is not within a clear line of sight to GPS satellites. Additionally, in particular situations, this method for determining the location of an electronic device may be a faster than using GPS services.

In several implementations, the device communicating module 408 may receive notifications from the electronic device 104 that it is ready to upload communication node data to the server. In many cases, the device communicating module 408 may communicate with the electronic device 104 via the network component 402. As this communication node data is acquired by the server 102, a significant amount of network bandwidth is utilized. For example, each electronic device may collect communication node data over a time period of days or weeks. After a certain time period, the electronic device 104 will need to upload the data to the server 102. As mentioned with regards to FIG. 3, the electronic device 104 may be programmed to upload to a single server or multiple servers. In the case where the electronic device uploads to multiple location servers, each location server may be owned by a different vendor. In one implementation, the frequency at which the electronic device 104 uploads the communication node data is predetermined. For example, the electronic device may upload the communication node data every 24 hours or 48 hours. In another implementation, the electronic device 104 may upload the communication node data once a threshold amount of the electronic device's memory is occupied by the communication node data. For example, the electronic device may upload the communication node data after some threshold percentage (e.g., 25 percent) of the phone's memory is used up.

In various implementations, the map generating module 410 may update a map such as map data 320. The map data 320 may contain multiple data points 340A-340N, where each data point contains a latitude 342, a longitude 344 and a radius 346. Additionally, in several implementations, the map generating module 412 may provide an expiration date corresponding to the map data 320. This expiration date may correspond to a date after which the map data 320 may no longer be accurate. For example, in cases where the location of a communication node might change, the server 102 may need to refresh the communication node data 116A-116N such that it reflects the new location of the communication node. In such instances the map data 320 may also be updated by the map generating module 410. In several implementations, the expiration date may be a simple time stamp, such as time stamp 348, indicating to the electronic device 104 a time at which the electronic device should download new map data. In other implementations, the electronic device 104 may query the server 102 at predetermined intervals of time to determine whether new map data is available for download.

Figure 5:
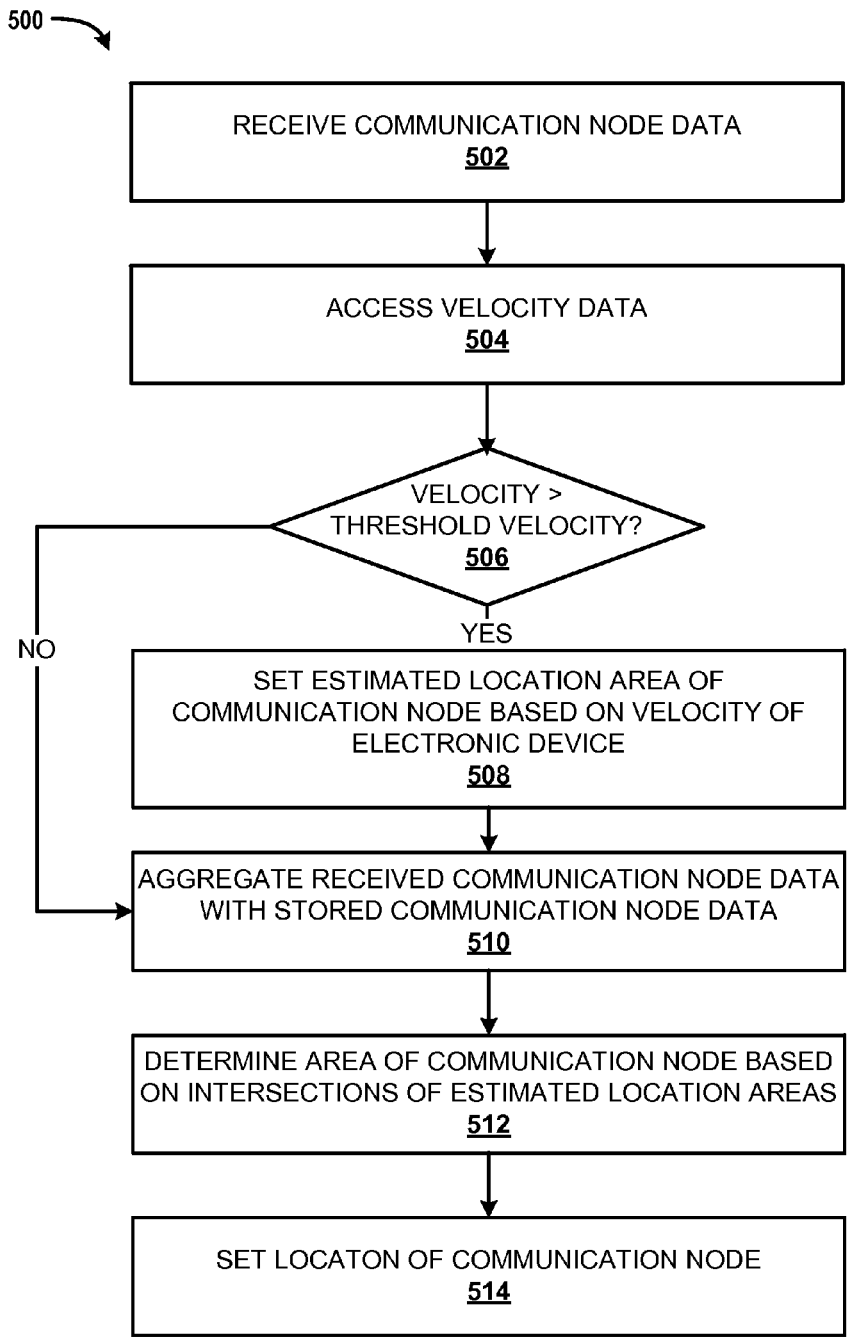
FIG. 5 illustrates a process for a crowdsourcing technique to determine locations of communication nodes using velocities of electronic devices that detect the communication nodes.
Figure 6:
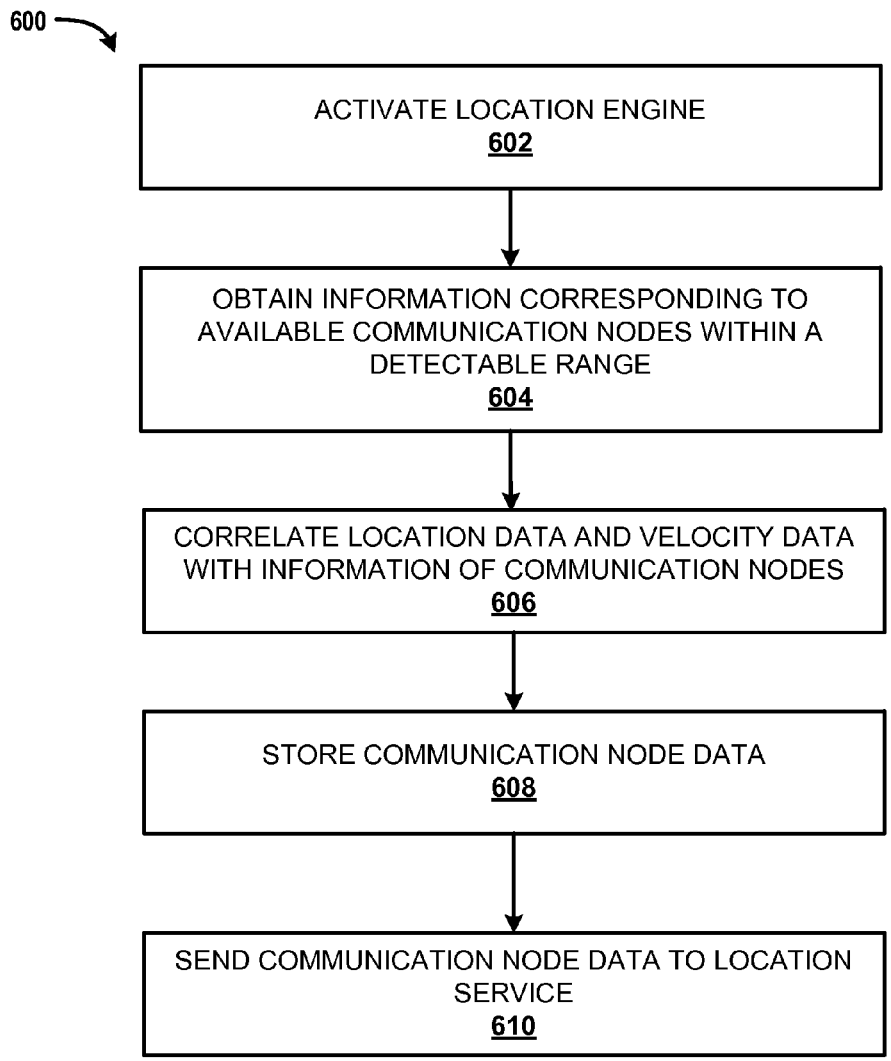
FIG. 6 illustrates a process for generating communication node data, including velocity data, associated with locations of communication nodes.

FIG. 5 and FIG. 6 are flow diagrams illustrating example processes for gathering data related to communication nodes and determining locations of the communication nodes. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described block can be combined in any order and/or in parallel to implement the process, of alternative processes, and not all of the blocks need to be executed. For discussion purposes, the processes herein are described with reference to the frameworks, architectures and environments described in the examples herein, although the processes may be implemented in a wide variety of other frameworks, architectures or environments.

FIG. 5 illustrates a process 500 for a crowdsourcing technique to determine locations of communication nodes using velocities of electronic devices that detect the communication nodes. The process 500 may be performed by the location service 106, the servers 102, or some other component or device.

At 502, communication node data is received. As discussed above, one or more servers 102 of the location service 106 may receive the communication node data 116. In some examples, the communication node data 116 may be received after a device detects a communication node, periodically (e.g., every 12 hours, 24 hours, on a weekly basis), or in response to some other event or condition. In some configurations, the communication node data may be received from an electronic device 104 after the communication node data occupies a threshold amount of device memory.

At 504, the velocity data associated with the received communication node data is accessed. As discussed above, each record may include location data and velocity data associated with the electronic device at or near a time when the electronic device detected a communication node.

At 506, a determination is made as to whether the velocity of the accessed record in the communication node data is greater than a threshold velocity. As discussed above, the velocity of an electronic device may indicate how accurate the location of the detected communication node is based on the location of the electronic device 104. In some examples, the value of the threshold velocity is set to above walking speed (e.g., above 5 mph). In other examples, the value of the threshold velocity is set to above a slow driving speed (e.g., above 10 mph). Generally, the threshold velocity may be set to any value, such as specified by an authorized user of the location service 106. When the velocity is above the threshold velocity, the process moves to 508. When the velocity is below the threshold velocity, the process moves to 510.

At 508, the location area of the communication node is set based on the velocity of the electronic device. As discussed above, the location area of the electronic device 104 may be set to be outside of an exclusion area (e.g., some area around the location specified by the electronic device 104). For instance, the location of the electronic device 104 may be set to be located closer to the location of communication node provided by other electronic devices 104 that are not associated with an exclusion area (e.g., walking, biking) In other examples, the location area may be set to be near a location of a building as determined from map data. In some examples, the size of the exclusion area increases as the speed of the electronic device increases. In other examples, the size of the exclusion area is based on the average speed of electronic devices that detect a communication node on a same pathway (e.g., on an interstate or road). In some further examples, the location area is the area that is outside of the determined exclusion area and within the range of the commination node. For instance, if the exclusion area is a circle having a radius of 15 meters and the range of the communication node is 75 meters, then the estimated location area is the area between the 15 meters and 75 meters.

At 510, the received data is aggregated with the stored communication node data. As discussed above, the more data points available to determine the location of a communication node generally results in more accurate results. Generally, the more data that is received provides more estimated location areas that may intersect with each other.

At 512, the area of the communication node is determined based on the intersections of estimated location areas. As discussed, the communication node is likely to be located at an area that is formed by intersections formed by the estimated locations associated with the electronic devices providing communication node data.

At 514, the location of the communication node is set. As discussed above, by setting the location of the communication node data using the velocity data, the determined location of the communication nodes will likely be more accurate. For instance, instead of identifying a communication node as being located on an Interstate, the communication node will be identified as being located outside of the Interstate. Generally, the more communication node data that is received from different electronic devices traveling at different speeds may result in a more accurate location for a communication node. For instance, as more electronic devices provide communication node data, the intersection of the circles 120 (as shown in FIG. 1) will provide a more definitive location for a communication node.

FIG. 6 illustrates a process 600 for generating communication node data, including velocity data, associated with locations of communication nodes. The process 600 may be implemented by the electronic device 104. At 602, the electronic device may activate the location engine. For example the electronic device may activate a GPS engine resident on the device 104 to determine location data for the device. In various implementations, the location engine may be activated in response to an application requesting the location of the electronic device.

At 604, the electronic device may obtain information corresponding to available communication nodes within a detectable range. This information may include a MAC address or SSID of the communication node as well as a signal strength value of the communication node detected by the electronic device. As discussed previously, to obtain this information the device may initiate a scan to detect communication nodes within range of the device. Obtaining information corresponding to available communication nodes may also include using information from a scan for detecting communication nodes conducted prior to the activation of the location engine. If any communication nodes are detected, the electronic device stores a communication node identifier and signal strength associated with each detected communication node.

At 606, the location data and velocity data of the electronic device may be correlated with information pertaining to each of the detected communication nodes to generate communication node data. The communication node data may include a device identifier associated with the device, the latitude and longitude of the current location of the device, the velocity of the device, the MAC address of the communication node, the signal strength value, and a time that the communication node data was generated. Accordingly, in various implementations, the electronic device may correlate the latitude and longitude of its location with the data corresponding to each detected communication node using the velocity data. As discussed above, the velocity data may be used to adjust the location of the device (e.g., move the device off the location of a pathway and closer to the location of the access point). Through this correlation, the communication nodes are essentially identified or tagged as being associated with the device location, thereby forming communication node data.

At 608, the communication node data may be stored. As discussed above, the communication node data 116 may be stored in the memory of the electronic device 104.

At 610, the communication node data may be sent to the location service 106. As discussed above, the communication node data may be sent to the location service periodically, at predetermined time intervals, after a particular time lapse, following a change in location, in response to a request from the server, when the memory storing the communication node data is full or above some threshold, or in response to some other event or condition.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
receiving first data from a mobile electronic device, the first data including an identification of a wireless access point (AP) detected by the mobile electronic device, a velocity of the mobile electronic device at a time the AP was detected by the mobile electronic device, and location data of the mobile electronic device that identifies a physical location of the mobile electronic device at the time the AP was detected;
determining that the mobile electronic device was moving at a velocity above a predetermined threshold at the time the AP was detected;
setting a radius of an exclusion area based, at least in part, on the velocity of the mobile electronic device at the time the AP was detected, wherein the physical location of the mobile electronic device at the time the AP was detected is at the center of the exclusion area;
setting a first estimated location area of the AP to be outside of the exclusion area, the first estimated location area including an area between a first boundary that starts at the outside of the exclusion area and extends to a second boundary that is a distance from the mobile electronic device that corresponds to the transmission range of the AP;
storing the first estimated location area of the AP with other estimated locations of the AP, the other estimated location areas of the AP determined from second data received from other mobile electronic devices, the second data including velocity data of the other mobile electronic devices and location data of the other mobile electronic devices;
determining an intersection area for the first estimated location area and at least a portion of the other estimated location areas; and
setting an estimated location of the AP to be within the intersection area.

2. The method of claim 1, wherein setting the radius of the exclusion area comprises accessing map data to determine that the mobile electronic device was located on a road at the time the AP was detected and setting the radius based, at least in part, on a speed limit of the road.

3. The method of claim 1, further comprising determining an average velocity based on the velocity of the electronic device and the velocities of the other electronic devices that detected the AP and setting the radius of the exclusion area based, at least in part, on the average velocity.

4. A method comprising:
receiving, from an electronic device, first velocity data, first location data, and first communication node data, the first velocity data associated with a velocity of the electronic device at a time a communication node was detected by the electronic device and the location data associated with a location of the electronic device at the time the communication node was detected by the electronic device; and estimating a location of the communication node based, at least in part, on the first velocity data and the first location data.

5. The method as recited in claim 4, wherein estimating the location of the communication node comprises setting the location of the communication node to be outside of a first area, a size of the first area based, at least in part, on the velocity of the electronic device.

6. The method as recited in claim 4, wherein estimating the location of the communication node comprises identifying that the electronic device was located on a portion of a road when the communication node was detected, and setting the location of the communication node to not be on the road and within a specified distance from the location of the electronic device.

7. The method as recited in claim 4, wherein estimating the location of the communication node comprises setting the location of the communication node to be a distance greater than a specified distance from the location of the electronic device based, at least in part, on an average velocity of at least a portion of electronic devices that detected the communication node.

8. The method as recited in claim 4, further comprising determining that the electronic device was in motion when the communication node was detected based, at least in part, on map data and the location of the electronic device at the time the communication was detected.

9. The method as recited in claim 4, further comprising determining other estimated location areas of the communication node, the other estimated location areas of determined from second data received from other mobile electronic devices, the second data including velocity data of the other mobile electronic devices and wherein estimating the location of the communication node includes setting the location of the communication node within an intersection area of the estimated location area and at least a portion of individual ones of the other estimated location areas.

10. The method as recited in claim 4, further comprising receiving second velocity data, second location data, and second communication node data, the second velocity data associated with a velocity of a second electronic device and the location data associated with a location of the second electronic device when the communication node was detected by the second electronic device and the communication node data associated with the communication node detected by the electronic device and the second electronic device; and wherein estimating the location of the communication node includes averaging a first estimated location associated with the electronic device and a second estimated location associated with the second electronic device.

11. The method as recited in claim 4, wherein receiving, from the electronic device, comprises receiving one or more of a time of detection of the communication node, an accuracy value of the location data, and a signal strength associated with the detected communication node.

12. The method as recited in claim 4, wherein estimating the location of the communication node comprises setting the location of the communication node to be at least a first distance from the location of the electronic device based, at least in part, on zoning information and the velocity of the electronic device.

13. The method as recited in claim 4, wherein estimating the location of the communication node comprises determining a size of an exclusion area based, at least in part, on the location of the electronic device and the velocity of the electronic device, the exclusion area including the location of the electronic device and setting the location of the communication node to be within an area outside of the exclusion area.

14. A server, comprising:
 a processor; and
 a memory coupled to the processor and storing instructions executable by the processor to perform operations comprising:
  receiving, from an electronic device, first velocity data, first location data, and first communication node data, the first velocity data associated with a velocity of the electronic device and the location data indicating a location of the electronic device associated with a time the communication node was detected by the electronic device;
  estimating a first location area of the communication node based, at least in part, on the first velocity data, and the first location data;
  receiving, from other electronic devices, second velocity data, second location data, and second communication node data, the second velocity data associated with velocities of the other electronic devices and the location data indicating locations of the other electronic devices associated with a time the communication node was detected by the other electronic devices; and
  estimating a location of the communication node based, at least in part, on the first location area, the second velocity data, and the second location data.

15. The server of claim 14, wherein estimating the first location area of the communication node comprises setting the first location area to be outside of an exclusion area that is determined based, at least in part, on the first velocity data of the first electronic device associated with the time the communication node was detected by the device.

16. The server of claim 14, wherein estimating the location of the communication node includes averaging estimated locations associated with at least a portion of the first electronic device and the other electronic devices.

17. The server of claim 14, wherein estimating the first location area of the communication node comprises setting the first location area to be outside of an area surrounding the first electronic device based, at least in part, on zoning information.

18. The server of claim 14, wherein the communication node is a Wireless Access Point and wherein estimating the first location area of the communication node comprises setting the first location area to be outside of an area surrounding the first electronic device in response to determining that a velocity of the first electronic device exceeds a threshold.

19. The server of claim 14, wherein receiving, from the electronic device further comprises receiving signal strength data associated with the communication node and setting the first location area based, at least in part, on the signal strength data.

20. The server of claim 14, wherein estimating the first location area comprises determining that a velocity of the first electronic device is above a threshold and setting an exclusion area to at least a specified distance from the first electronic device.

* * * * *